US012769686B2

(12) United States Patent
Papenfort et al.

(10) Patent No.: US 12,769,686 B2
(45) Date of Patent: Oct. 20, 2026

(54) AUTOMATION SYSTEM

(71) Applicant: Beckhoff Automation GmbH, Verl (DE)

(72) Inventors: Josef Papenfort, Hüllhorst (DE); Henning Mersch, Verl (DE)

(73) Assignee: Beckhoff Automation GmbH, Verl (DE)

( * ) Notice: Subject to any disclaimer, the term of this patent is extended or adjusted under 35 U.S.C. 154(b) by 16 days.

(21) Appl. No.: 19/035,405

(22) Filed: Jan. 23, 2025

(65) Prior Publication Data

US 2025/0173291 A1 May 29, 2025

Related U.S. Application Data

(63) Continuation of application No. PCT/EP2023/070889, filed on Jul. 27, 2023.

(30) Foreign Application Priority Data

Aug. 2, 2022 (DE) ..................... 10 2022 119 309.8

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
CPC ............................ G06F 13/36; G06F 2213/40
See application file for complete search history.

(56) References Cited

U.S. PATENT DOCUMENTS 6,216,172 B1 * 4/2001 Kolblin ............... H04L 61/5038 709/227
8,089,980 B2 1/2012 Loebig et al.
(Continued)

FOREIGN PATENT DOCUMENTS

CN 101094162 A 12/2007
CN 101394306 A 3/2009
(Continued)

OTHER PUBLICATIONS

Office Action dated Nov. 14, 2025 in connection with Chinese patent application No. 202380057681.2, 15 pages including English translation.

(Continued)

*Primary Examiner* — Eric T Oberly
(74) *Attorney, Agent, or Firm* — Dorsey & Whitney LLP

(57) ABSTRACT

In an automation system, a substitute server unit is configured to receive normal telegrams exchanged between a main server unit and a client unit. The functionality of the main server unit is continuously monitored. If a failure event of the main server unit is detected, the substitute server unit is configured to activate a failure operating mode, wherein the substitute server unit and the client unit exchange failure telegrams in the failure operating mode. In the failure telegrams, the predefined user data structure of the normal telegrams is divided up into relevant data elements and optional data elements. The substitute server unit is configured to use the data values of the relevant data elements of the current normal telegram for the relevant data elements of the first failure telegram and to use the default data values specified for the optional data elements of the first failure telegram.

8 Claims, 5 Drawing Sheets

(56) References Cited

U.S. PATENT DOCUMENTS

| | | | |
|---|---|---|---|
| 10,102,163 B2 | 10/2018 | Spiegel et al. | |
| 11,190,393 B2 | 11/2021 | Rentschler et al. | |
| 2004/0153757 A1 | 8/2004 | Blakeney | |
| 2004/0194105 A1 | 9/2004 | Shenfield et al. | |
| 2006/0075085 A1 | 4/2006 | Borg | |
| 2010/0005336 A1 | 1/2010 | Jordan et al. | |
| 2016/0357778 A1* | 12/2016 | MacKenzie | G06F 13/36 |
| 2017/0295255 A1* | 10/2017 | Horn | H04L 63/0272 |
| 2020/0162178 A1* | 5/2020 | Hubert | H04L 63/123 |
| 2023/0231736 A1 | 7/2023 | Büttner et al. | |

FOREIGN PATENT DOCUMENTS

| | | | |
|---|---|---|---|
| CN | 103825777 | A | 5/2014 |
| CN | 104639367 | A | 5/2015 |
| CN | 106685764 | A | 5/2017 |
| CN | 108989367 | A | 12/2018 |
| CN | 109167737 | A | 1/2019 |
| CN | 209233854 | U | 8/2019 |
| DE | 102018102067 | A1 | 8/2019 |
| DE | 102020127804 | A1 | 4/2022 |
| DE | 102016200105 | B4 | 5/2022 |
| EP | 1692816 | B1 | 4/2008 |
| EP | 2905662 | B1 | 11/2017 |
| EP | 3072262 | B1 | 7/2019 |
| JP | 4997219 | B2 | 5/2012 |
| WO | 9849621 | A1 | 11/1998 |
| WO | 03090084 | A1 | 10/2003 |
| WO | 2021007708 | A1 | 1/2021 |
| WO | 2021008413 | A1 | 1/2021 |

OTHER PUBLICATIONS

Examination Report dated Jul. 6, 2023 in connection with German patent application No. 102022119309.8, 22 pages including English translation.

International Search Report and Written Opinion dated Oct. 27, 2023 in connection with International Patent Application No. PCT/EP2023/070889, 22 pages including English translation.

Office Action dated May 27, 2025 in connection with Chinese patent application No. 202380057681.2, 15 pages including English translation.

* cited by examiner

AUTOMATION SYSTEM

CROSS-REFERENCE TO RELATED APPLICATIONS

This patent application is a continuation of International Patent Application No. PCT/EP2023/070889, filed Jul. 27, 2023, entitled "Automation System," which claims the priority of German patent application DE 10 2022 119 309.8, filed Aug. 2, 2022, entitled "Automatisierungssystem," which are incorporated by reference herein, in the entirety and for all purposes.

FIELD

The invention relates to an automation system.

BACKGROUND

In automation technology, network systems are often used in which the decentralized devices of a machine periphery such as I/O modules, measuring transducers, drives, valves and operator terminals communicate with automation, engineering or visualization systems. All bus subscribers are connected to one another via a field bus, usually a serial field bus, wherein data exchange via the field bus is often carried out on the basis of hierarchical server-client access management in the form of datagrams, also referred to as telegrams.

The server units on the field bus, usually the controllers, have bus access authorization and determine the data transfer. The client units on the field bus, usually machine devices, do not have bus access authorization, i.e. they may only acknowledge received telegrams or transmit telegrams at the request of the server units.

The telegrams consist of control data and user data. The Ethernet standard is generally used as the protocol for controlling data exchange on the field bus, which allows for transmitting telegrams having a length of up to 1500 bytes at a simultaneously high transmission rate of up to 10 Gbit/sec.

The field bus of the automation system is often embodied as a ring structure in which the individual client units are connected to one another on the transmission path to form a line, with each bus subscriber being connected to two neighbors and the first and last bus subscriber in the ring being connected to the server unit.

A requirement of a server-client automation system, particularly when used in manufacturing and process automation, is a high level of fault tolerance. One fault in the automation system that must be overcome without damage is the failure of the server unit.

An additional substitute server unit is therefore often provided in the automation systems. EP 3 072 262 B1 describes such an automation system having two identical server units. If one server unit fails, the other server unit may take over control of the automation system. However, forming a redundant controller in the automation system having two identical server units is complex and costly. Depending on the machine controlled by the automation system, it may also be sufficient to transfer the machine to a safe state if the server unit fails instead of maintaining the full functional scope of the machine.

The object of the invention is to provide an automation system in which the failure of the server unit is reliably detected and the machine controlled by the automation system then continues to operate, as the case may be, with a reduced range of functions.

SUMMARY

According to an aspect, an automation system comprising a plurality of bus subscribers which are connected to one another via a field bus in order to exchange telegrams having a predetermined data structure between the bus subscribers. The plurality of bus subscribers comprises a main server unit, a substitute server unit and at least one client unit. In a normal operating mode, the main server unit and the client unit exchange normal telegrams having a predetermined user data structure. The substitute server unit is embodied to receive the normal telegrams exchanged between the main server unit and the client unit.

The functionality of the main server unit is continuously monitored and then, if a failure event of the main server unit is detected, the substitute server unit is embodied to activate a failure operating mode. In failure operating mode, the substitute server unit and the client unit exchange failure telegrams. In the failure telegrams, the predetermined user data structure of the normal telegrams is divided up into relevant data elements and optional data elements. The substitute server unit is embodied to use the data values of the relevant data elements of the currently present normal telegram for the relevant data elements of the first failure telegram and predetermined default data values for the optional data elements of the first failure telegram.

EXAMPLES

In an automation system, a plurality of bus subscribers is connected to one another via a field bus in order to exchange telegrams with a predefined data structure between the bus subscribers. The bus subscribers comprise a main server unit, a substitute server unit and at least one client unit. In a normal operating mode, the main server unit and the client unit exchange normal telegrams with a predefined user data structure. The substitute server unit is embodied to receive the normal telegrams exchanged between the main server unit and the client unit.

The functionality of the main server unit is continuously monitored. If a failure event of the main server unit is detected, the substitute server unit is embodied to activate a failure operating mode, wherein the substitute server unit and the client unit exchange failure telegrams in the failure operating mode. In the failure telegrams, the predefined user data structure of the normal telegrams is divided up into relevant data elements and optional data elements. The substitute server unit is embodied to use the data values of the relevant data elements of the current normal telegram for the relevant data elements of the first failure telegram and to use predefined default data values for the optional data elements of the first failure telegram. Default data values may e.g. be expected values and may be specified by the operator.

Such a server-client automation system may achieve a high level of fault tolerance, particularly when used in production and process automation. The failure of the main server unit is survived without damage, as the additional substitute server unit takes over control of the automation system. However, a smaller server unit and/or a substitute server unit with a simple or robust control program code may then be used as a substitute server unit.

In failure operating mode, the client unit may comprise a different range of functions compared to the normal operating mode, wherein the range of functions of the client unit in failure operating mode preferably provides a secured state of the client unit. In principle, less input data from the machine's sensors are then required for the failure operating mode than for the normal operating mode. Furthermore, the output data set for the machine's actuators is also reduced in failure operating mode.

A control program code of the substitute server unit differs at least in part from a control program code of the main server unit. This may prevent a programming error in the control task of the main server unit from causing the substitute server unit to also fail after the main server unit fails. The control program code on the main server unit may then also be replaced without further ado.

The substitute server unit comprises a repository having a plurality of failure operating modes, wherein the substitute server unit is embodied to select the failure operating mode from the plurality of failure operating modes when the failure operating mode is activated on the basis of the data values of the relevant data elements of the currently present normal telegram and/or a status information continuously transmitted from the main server unit to the substitute server unit. In this manner, the optimum failure operating mode for the client unit may be quickly determined depending on the operating status of the client unit.

If the substitute server unit detects a restoration of the functionality of the main server unit after the failure of the main server unit, the substitute server unit is embodied to transmit the relevant data elements of the failure telegrams to the main server unit. To reactivate the normal operating mode, the main server unit is preferably embodied to use the data values of the relevant data elements of the last failure telegram transmitted by the substitute server unit for a first normal telegram. This allows for reliably resuming normal operation of the client unit.

Furthermore, the substitute server unit may be embodied to assume a failure of the main server unit in the event of a predefined deviation in behavior and/or from the normal state of the main server unit. The failure of the main server unit may thus be detected at an early stage. In order to intercept dangerous situations, the substitute server unit takes over operation and ensures a safe state.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
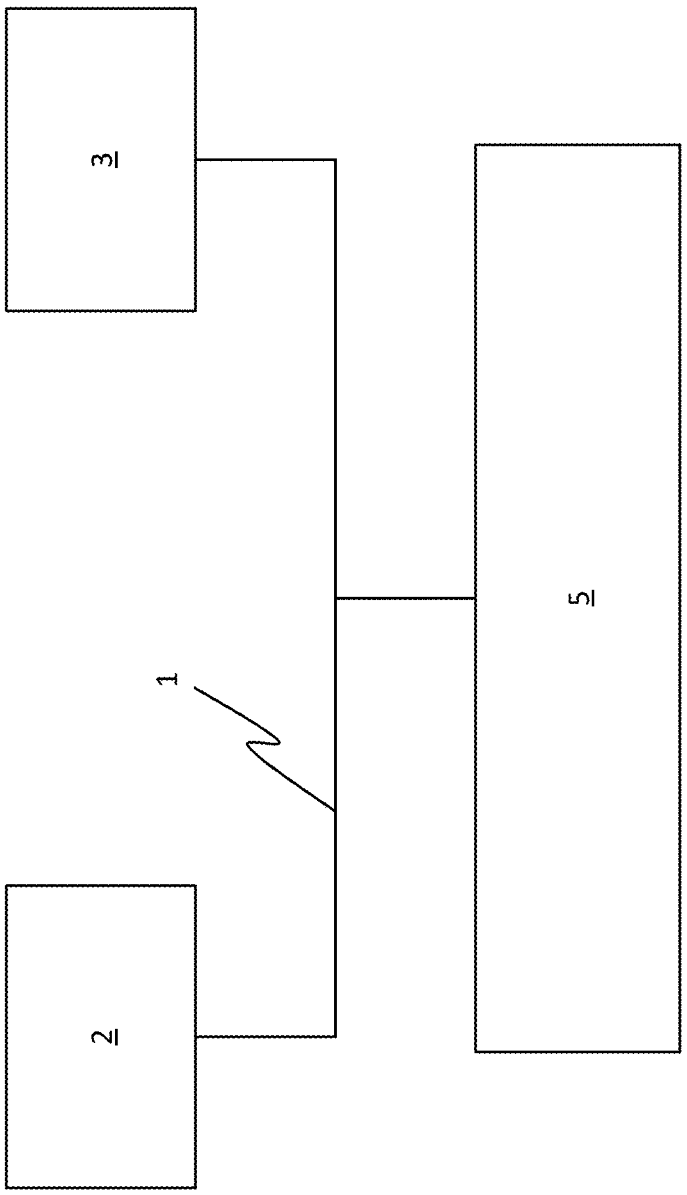
FIG. 1 schematically shows the structure of an automation system having two server units.

In the following, machines are understood to be devices equipped with at least one drive system. In this context, the term machine also includes systems that are arranged and controlled in such a way that they function as a unitary whole.

In industrial automation, networks are used to connect distributed field devices on a sensor/actuator level with a control level. The automation systems, also referred to as field bus systems, usually have a field bus to which the bus devices are connected. Various field bus concepts may be used, which differ in terms of the connection structure, the field bus access and the field bus protocol.

The field bus protocol defines how data are to be exchanged between the bus subscribers on the field bus. The field bus protocol determines the rules and formats for the communication behavior of the bus subscribers. The message structure defined by the field bus protocol contains all the important information for data exchange, such as transmitter and recipient, message type, message size and checksum to ensure error-free transmission. This information is placed as control data in front of the user data in the message as a header and/or attached to the user data in the message as a trailer.

The Ethernet protocol is often used as the basic protocol in the field bus. The Ethernet protocol divides up the data to be transmitted into what is referred to as frames, the structure of which is defined in the IEEE 802.3 standard. The actual Ethernet frame is preceded by a preamble and a start bit, also referred to as Start Frame Delimiter SFD. This is followed by the actual Ethernet telegram. The Ethernet telegram consists of a header section, the header, a user data block and an end section, the trailer.

The header starts with a 6-byte field for the target address, which is followed by another 6-byte field with the source address. This may be followed by another 6-byte field, the so-called tag field, with additional control data in the header, which particularly contains prioritization information. The header ends with a 2-byte field, referred to as the type field, which provides information about the field bus protocol with the aid of which the data in the user data block is to be processed.

The user data block following the header may comprise a length of 1500 bytes, although larger data blocks may also be permitted in various Ethernet protocol extensions. The user data block may be terminated by the so-called PAD field (padding bits field) in order to guarantee the specified minimum length of the Ethernet frame.

The user data block is followed by the trailer, which has a 6-byte field comprising a checksum. When an Ethernet telegram is created, a CRC calculation is carried out on the bit sequence and the checksum is appended to the user data block. The receiver carries out the same calculation after receipt. If the checksum received does not match the self-calculated checksum, the receiver assumes that the transmission is faulty. The Ethernet telegram is then discarded.

The use of the Ethernet standard in industrial automation makes it possible to provide real-time solutions in particular. Real-time capable field bus systems based on the Ethernet standard include PROFINET, EtherCAT, Powerlink or SERCOS III. The field bus protocol used in each case is displayed as a type field in the header of the Ethernet frame. However, instead of the Ethernet standard, other field bus protocols such as CANopen, Interbus or Profibus may also be used in automation systems.

Automation systems are usually operated with a server-client structure. The server units in the automation system are the active bus subscribers and have bus access authorization to determine the telegram traffic on the field bus. The server units form the control level in the automation system.

The client units are passive bus subscribers that do not have bus access authorization and may only transmit data when requested by the server units. The client units are usually machine peripherals, such as I/O devices, valves, drives and transmitters.

Automation systems having a server-client structure are often embodied in such a way that the individual client units are connected to form a chain via the transmission medium, wherein each client unit is connected to two neighbors and the first and last client unit in the chain are connected to the server unit, resulting in a ring structure. Data transmission in the form of telegrams on the field bus then takes place in one direction, starting from the server unit to the first neighboring client unit and from there to the next to the last client unit and then back to the server unit.

In automation systems, control is usually carried out in such a way that the server unit preferably carries out control tasks cyclically in order to generate output data for the client unit on the basis of input data from client units. An execution of the control task corresponds to one control process cycle.

After concluding the control process cycle, the server unit sends the output data generated on the basis of input data from the client units as telegrams on the field bus. In a field bus design in the form of a ring structure, the client units then extract the output data allocated to the respective client unit from the telegrams as the telegrams pass through the client unit in order to execute a local client unit process with the output data. The data determined in the local client unit process is then entered into the telegrams circulating on the field bus in the areas provided for this purpose by the client unit. The server unit then uses the transmitted data as input data for the next control process cycle.

A requirement of a server-client automation system, especially when used in production and process automation, is a high level of fault tolerance. A fault in the automation system that must be overcome without damage is the failure of the server unit. For this reason, at least two server units are provided in the automation system, with one server unit serving as the main server unit and the other server unit as a substitute server unit. If the main server unit fails, the other substitute server unit may then over control of the automation system.

In this context, the automation system is embodied in such a way that in a normal operating mode, the main server unit exchanges normal telegrams with the client units using a predefined user data structure. The substitute server unit receives the normal telegrams exchanged between the main server unit and the client units. The functionality of the main server unit is continuously monitored.

If a failure of the main server unit is detected, the substitute server unit activates a failure operating mode in which the substitute server unit and the client units exchange failure telegrams.

The failure of the main server unit may result in mechanical damage to the machine, for example if electronically coupled axes of the machine run into each other and parts of the machine are destroyed. To deal with this situation, if the main server unit fails, the substitute server unit takes over operation of the machine, with the substitute server unit transferring the machine to a safe state in failure operating mode.

The failure operating mode may be a controlled switch-"off" of the machine, for example by ramping down the coupled axes. However, a failure operating mode with a reduced range of functions may also be implemented. For example, an agitator in a machine may continue to rotate at a constant speed in order to prevent materials from sticking together.

Less input data from the machine's sensors is generally required for the failure operating mode than for the normal operating mode. Furthermore, the output data set for the machine's actuators may also be reduced in failure operating mode.

In the failure telegrams output to the field bus by the substitute server unit during failure operating mode, the predefined user data structure of the normal telegrams is divided up into relevant data elements and optional data elements, wherein the substitute server unit is embodied to use the data values of the relevant data elements of the currently available normal telegram for the relevant data elements of the first failure telegram and predefined default data values for the optional data elements of the first failure telegram.

It is also advantageous if different programming is carried out in the substitute server unit than in the main server unit. This may prevent a programming error in the control task of the main server unit from causing the substitute server unit to also fail after the main server unit fails. The substitute server unit then has a different control program code than the main server unit, i.e. the control program code of the substitute server unit is not the same or at least partially not the same as the control program code carried out on the main server unit. The control program code on the main server unit may thus also be exchanged without further ado.

If the control program code of the main server unit crashes, the substitute server unit physically rescues the machine. The control program code on the substitute server unit is then also leaner and less complex compared to the control program code of the main server unit. The control program code of the substitute server unit is also embodied to be particularly secure and is tested intensively to ensure that the failure operating mode of the substitute server unit works reliably and error-free.

The control program code on the substitute server unit may have a repository comprising a plurality of failure operating modes in order to be able to respond to different situations in which the substitute server unit is to take control of the machine with an appropriate failure operating mode. The substitute server unit is then embodied in such a way that when the failure operating mode is activated, the failure operating mode is selected from the plurality of failure operating modes on the basis of the data values of the relevant data elements of the currently available normal telegram and/or a status information continuously transmitted from the main server unit to the substitute server unit.

The control program code on the substitute server unit continuously obtains user data from the main server unit in normal operating mode in order to take over the machine in the current state in the event of a failure and execute the failure operating mode. To carry out the synchronization process, the substitute server unit is embodied to receive the normal telegrams exchanged between the main server unit and the client units in normal operating mode with the specified user data structure.

If the main server unit fails in failure operating mode, the substitute server unit continues to transmit the failure telegrams to the field bus. This ensures that the telegram traffic on the field bus is only ever operated by a maximum of one server unit, i.e. the main server unit in normal operating mode and the substitute server unit in failure operating mode.

If the main server unit fails, the substitute server unit takes control of the telegram traffic. The processes that are evaluated as a failure of the main server unit, for which the substitute server unit then activates the failure operating mode, may be external processes and/or internal processes in connection with the main server unit.

The external processes may be detected by the substitute server unit itself, i.e. no assistance from the main server unit is required. The main server unit may, for example, fail completely due to a physical defect or a program crash caused by a programming error. If the main server unit no longer sends a normal telegram, the substitute server unit recognizes this and starts the failure operating mode. However, the substitute server unit may also monitor a temperature range of the main server unit, for example, in order to detect a failure of an air conditioning system in a control cabinet of the main server unit, which is then evaluated as a failure of the main server unit. It must always be ensured that the main server unit is actually switched off so that the substitute server unit and the main server unit are reliably prevented from exercising control over the telegram traffic at the same time.

The internal processes for triggering the failure operating mode by the substitute server unit require that the main server unit itself transmits information that is then used to trigger a failure operating mode of the substitute server unit. Such internal processes which trigger the transmitting of failure information to the substitute server unit may be defined in the control program code of the main server unit. The control program code of the main server unit may strike, for example, if a cycle is exceeded or if the jitter is higher than expected, and then send failure information to the substitute server unit.

It is also possible for the substitute server unit to be triggered by a self-diagnosis of the main server unit. Such an internal process detected by self-diagnosis of the main server unit, which triggers the transmitting of failure information to the substitute server unit, may be a failure of the ventilation. The so-called S.M.A.R.T. system integrated in a hard disk of the main server unit, which monitors the reliability and service life of the hard disk, may also be used, for example, to determine whether a failure event of the main server unit has occurred. Furthermore, an evaluation of the resource utilization of the main server unit may be too high, for example because the main memory is more than 95% utilized or the hard disk is more than 95% full, and thus cause the main server unit to trigger the failure operating mode of the substitute server unit.

FIG. 1 shows the basic structure of an automation system having two server units. The automation system comprises a field bus 1, which may be an electrical cable, such as an optical fiber or a radio link as a transmission path. A main server unit 2, a substitute server unit 3 and client units 5 of a machine are connected to the field bus 1 as bus subscribers. The main server unit 2, the substitute server unit 3 and client units 5 of the machine may be connected directly to the transmission path of the field bus 1 or via an intermediate interface module.

The field bus 1 of the automation system may be embodied as a ring structure in which the individual client units 5 of the machine are connected to one another on the transmission path to form a line, wherein each client unit 5 is connected to two neighbors and the first client unit 5-1 and the nth client unit 5-N in the ring are connected to the main server unit 2 or to the substitute server unit 3.

Figure 2:
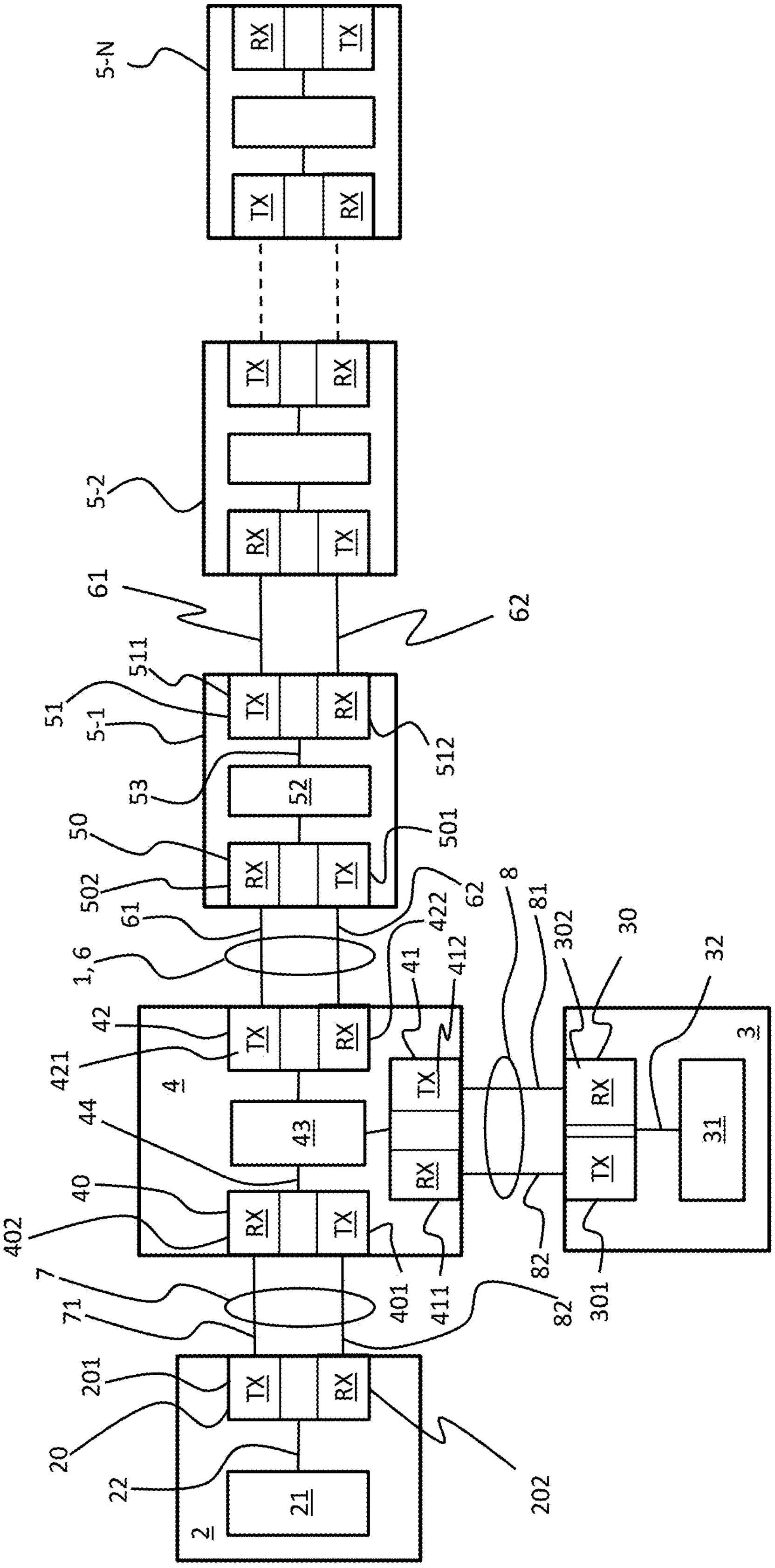
FIG. 2 shows schematically shows the structure of an automation system with two server units and a field bus embodied as a ring structure.

In order to switch between the main server unit 2 and the substitute server unit 3 with little additional hardware effort, the main server unit 2 and the substitute server unit 3 are connected to the field bus 1, which is embodied as a ring structure, via a distributor 4 (see FIG. 2).

FIG. 2 schematically shows the possible structure of such an automation system. The automation system comprises a main server unit 2 and a substitute server unit 3, a distributor 4 and a plurality of client units 5 numbered as first client units 5-1, second client unit 5-2, . . . , X-th client unit 5-X, . . . , 5-N, wherein X is an integer equal to or greater than 1 to N, wherein N is the total number of client units.

The main server unit 2 and the substitute server unit 3 have the same basic structure, but are different units. The main server unit 2 comprises a transmitting/receiving device 20 of the main server unit 2, which comprises a first transmitting unit TX 201 and a first receiving unit RX 202. Furthermore, the main server unit 2 includes a main server unit controller 21 connected to the main server unit transmitting/receiving device 20 via a main server unit data connection 22. The substitute server unit 3 comprises a transmitting/receiving device 30 the substitute server unit 3, which comprises a second transmitting unit TX 301 and a second receiving unit RX 302. Furthermore, the substitute server unit 3 includes a controller 31 the substitute server unit 3, which is connected to the transmitting/receiving device 30 the substitute server unit 3 via a data connection 32 of the substitute server unit 3.

The distributor 4 comprises a main server transmitting/receiving device 40 comprising a third transmitting unit TX 401 and a third receiving unit RX 402, a substitute server transmitting/receiving device 41 comprising a fourth transmitting unit TX 411 and a fourth receiving unit RX 412, and a client transmitting/receiving device 42 comprising a fifth transmitting unit TX 421 and a fifth receiving unit RX 422. Furthermore, a switching device 43 is provided which is connected to the main server transmitting/receiving device 40, the substitute server transmitting/receiving device 41 and the client transmitting/receiving device 42 via an internal data connection 44 of the distributor 4.

The main server unit 2, the substitute server unit 3 and the distributor 4 are embodied as separate components in FIG. 2. However, it is also possible to integrate the substitute server unit 3 and the distributor 4 into a single component, wherein the controller 31 of the substitute server unit 3 and the switching device 43 of the distributor 4 are then directly connected to each other via an internal data connection 44.

The field bus 1 of the automation system comprises a client field bus 6. The client field bus 6 comprises two unidirectional communication paths, which are referred to as the first communication path 61 and the second communication path 62. The client field bus 6 serially connects the distributor 4 and the first client units 5-1, the second client unit 5-2, . . . , the nth client unit 5-N with each other. The distributor 4 is connected via the fifth transmitting unit TX 421 of the client transmitting/receiving device 42 to the first communication path 61 as a telegram decoupling point and via the fifth receiving unit RX 422 of the client transmitting/receiving device 42 to the second communication path 62 as a telegram coupling point.

The transmitting/receiving device 20 of the main server unit 2 is connected to the main server transmitting/receiving device 40 of the distributor 4 via a main data bus 7. In this context, the first transmitting unit TX 201 of the transmitting/receiving device 20 of the main server unit 2 is connected to the third receiving unit RX 402 of the main server transmitting/receiving device 40 of the distributor 4 via a first unidirectional communication path 71. Furthermore, the first receiving unit RX 202 of the transmitting/receiving device 20 of the main server unit 2 is connected via a second unidirectional communication path 72 to the third transmitting unit TX 401 of the main server transmitting/receiving device 40 of the distributor 4.

The transmitting/receiving device 30 of the substitute server unit 3 is connected to the substitute server transmitting/receiving device 41 of the distributor 4 via a substitute data bus 8. In this context, the second receiving unit RX 302 of the transmitting/receiving device 30 of the substitute server unit 3 is connected to the fourth transmitting unit TX 412 of the substitute server transmitting/receiving device 41 of the distributor 4 via a third unidirectional communication path 81. Furthermore, the second transmitting unit TX 301 of the transmitting/receiving device 30 of the substitute server unit 3 is connected to the receiving unit RX 412 of the substitute server transmitting/receiving device 41 of the distributor 4 via a fourth unidirectional communication path 82.

The main data bus 7 and the substitute data bus 8 may each be embodied as a branch of the client field bus 6 which, in a ring shape, successively connects the distributor 4 to the first client unit 5-1, the second client unit 5-2, . . . , the nth client unit 5-N and then again to the distributor 4, wherein the first communication path 61 and the second communication path 62 of the client field bus 6 are operated in opposite directions.

The first client unit 5-1, the second client unit 5-2, . . . , the n-th client unit 5-N all have the same structure. The structure of a client unit 5 is described as an example. Viewed from the distributor 4, the client unit 5 has a first transmitting/receiving device 50 for connection to a previous bus subscriber and a second transmitting/receiving device 51 for connection to the next bus subscriber.

The first transmitting/receiving device 50 of the client unit 5 comprises a sixth transmitting/receiving device unit TX 501 and a sixth receiving unit RX 502, wherein the sixth transmitting/receiving device unit TX 501 of the first transmitting/receiving device 50 is connected to the second communication path 62 and the sixth receiving unit RX 502 of the first transmitting/receiving device 50 is connected to the first communication path 61.

The second transmitting/receiving device 51 of the client unit 5 comprises a seventh transmitting unit TX 511 and a seventh receiving unit RX 512, wherein the seventh transmitting unit TX 511 of the second transmitting/receiving device 51 is connected to the first communication path 61 and the seventh receiving unit RX 512 of the second transmitting/receiving device 51 is connected to the second communication path 62. A processing device 52, which is connected via an internal data connection 53 of the client unit 5, is connected between the first transmitting/receiving device 50 and the second transmitting/receiving device 51.

The processing unit 52 of the client unit 5 is embodied to process telegrams exchanged between the first transmitting/receiving device 50 and the second transmitting/receiving device 51 via the internal data connection 53 of the client unit 5. The telegram processing takes place when the telegram passes through the first communication path 61 of the additional field bus 6.

The fifth transmitting unit TX 421 of the client transmitting/receiving device 42 of the distributor 4 on the first communication path 61 of the further field bus 6 serves as a telegram decoupling point. The telegram passes successively through the first client unit 5-1, second client unit 5-2, . . . , n-th client unit 5-N connected to it on the first communication path 61 of the further field bus 6. The processing unit 52 of the client units, which is connected between the sixth receiving unit RX 502 of the first transmitting/receiving device 50 and the sixth transmitting unit TX 501 of the second transmitting/receiving device 51, processes the telegram as it passes through the client unit.

After the telegram has passed through the n-th client unit 5-N and has been processed, the processed telegram is fed back via the second communication path 62 of the client field bus 6 to the fifth receiving unit RX 422 of the client transmitting/receiving device 42 of the distributor 4, which serves as a telegram coupling point. The processed telegram on the second communication path 62 passes through the client units one after the other in reverse order, i.e. the n-th client unit 5-N, . . . , the second client unit 5-2 and the first client unit 5-1, wherein the telegram is only amplified by the processing unit 52 of the X-th client unit 5-X, but not processed.

The automation system is controlled by the main server unit 2 in normal operating mode. In failure operating mode, control is taken over by the substitute server unit 3. As part of a control task, the controller of the respective server unit, in normal operating mode the controller 21 of the main server unit 2 and in substitute operating mode the controller 31 of the substitute server unit 3, generates telegrams.

The controller 21 of the main server unit 2 is embodied to generate normal telegrams, each of which comprises a control data block, which may be divided up into a header section and a trailer section, and a user data block. The controller 31 of the substitute server unit 3 is embodied to generate failure telegrams, each of which comprises a control data block that is similar to the control data block of the normal telegrams, but comprises a payload data block that has been modified compared to the payload data block of the normal telegrams.

In the failure telegrams, the predefined user data structure of the normal telegrams is divided up into relevant data elements and optional data elements, wherein the substitute server unit 3 is embodied to use the data values of the relevant data elements of the currently available normal telegram for the relevant data elements of the first failure telegram and to use predefined default data values for the optional data elements of the first failure telegram.

The transmitting/receiving device 20 of the main server unit 2 transmits the normal telegrams via the main data bus 7 to the main server transmitting/receiving device 40 of the distributor 4 in normal operating mode. A normal operating mode switching rule set in the switching device 43 of the distributor 4 then forwards normal telegrams received by the main server transmitting/receiving device 40 to the client transmitting/receiving device 42 to output the normal telegrams on the first communication path 61 of the client field bus 6.

Furthermore, in the normal operating mode, the switching device 43 of the distributor 4 routes the feedback processed normal telegrams received from the client transmitting/receiving device 42 on the second communication path 62 of the client field bus 6 to the main server transmitting/receiving device 40 of the distributor 4 using the normal operating mode switching rule. The main server transmitting/receiving device 40 of the distributor 4 then transmits the feedback processed normal telegrams via the main data bus 7 to the transmitting/receiving device 20 of the main server unit 2.

In addition, the normal operating mode switching rule set in the switching device 43 of the distributor 4 routes normal telegrams received from the main server transmitting/receiving device 40 and feedback processed normal telegrams received from the client transmitting/receiving device 42 to the substitute server transmitting/receiving device 41 of the distributor 4. The substitute server transmitting/receiving device 41 of the distributor 4 then transmits the normal telegrams via the substitute data bus 8 to the transmitting/receiving device 30 of the substitute server unit 3.

Figure 3A:
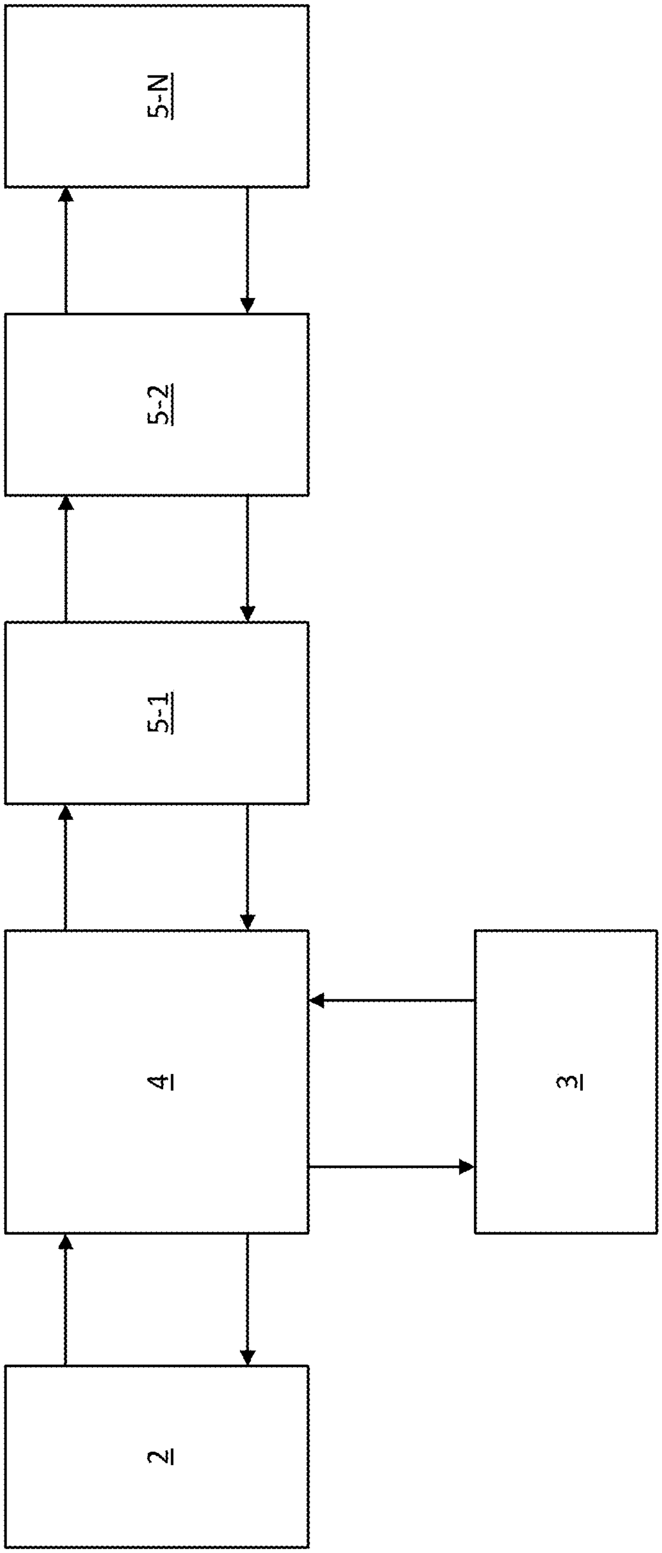
FIG. 3A shows a normal operating mode for the automation system shown in FIG. 2.

FIG. 3A shows the normal operating mode in the automation system described in FIG. 2, with the normal telegram transmission direction in the communication paths indicated by arrows.

Figure 3B:
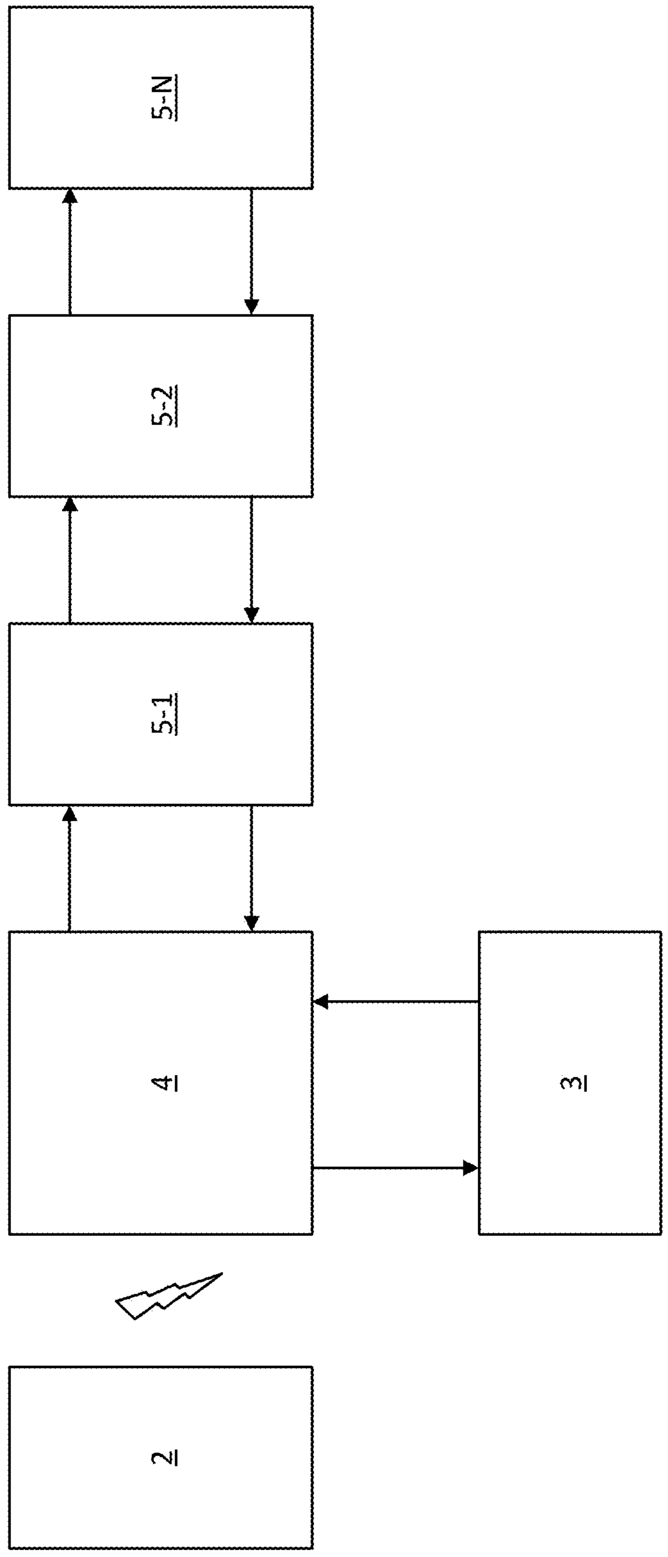
FIG. 3B shows a failure operating mode of the automation system shown in FIG. 2.

FIG. 3B shows the failure operating mode in the automation system described in FIG. 2, with the failure telegram transmission direction in the communication paths indicated by arrows.

In a failure operating mode, the failure operating mode switching rule set in the switching device 43 of the distributor 4 forwards failure telegrams received from the substitute server transmitting/receiving device 41 to the client transmitting/receiving device 42. Furthermore, the switching device 43 of the distributor 4 forwards feedback-processed failure telegrams received from the client transmitting/receiving device 42 to the substitute server transmitting/receiving device 41. The substitute server transmitting/receiving device 41 of the distributor 4 then transmits the failure telegrams via the substitute data bus 8 to the transmitting/receiving device 30 of the substitute server unit 3.

The distributor 4 thus ensures that, regardless of whether the telegrams in the automation system are generated by the main server unit 2 or the substitute server unit 3, the telegrams circulate in the data bus and are processed by all client units connected to the client field bus 6.

The telegram transmission is reconfigured automatically in real time when switching from the main server unit 2 to the substitute server unit 3, if the main server unit 2 fails.

Figure 4:
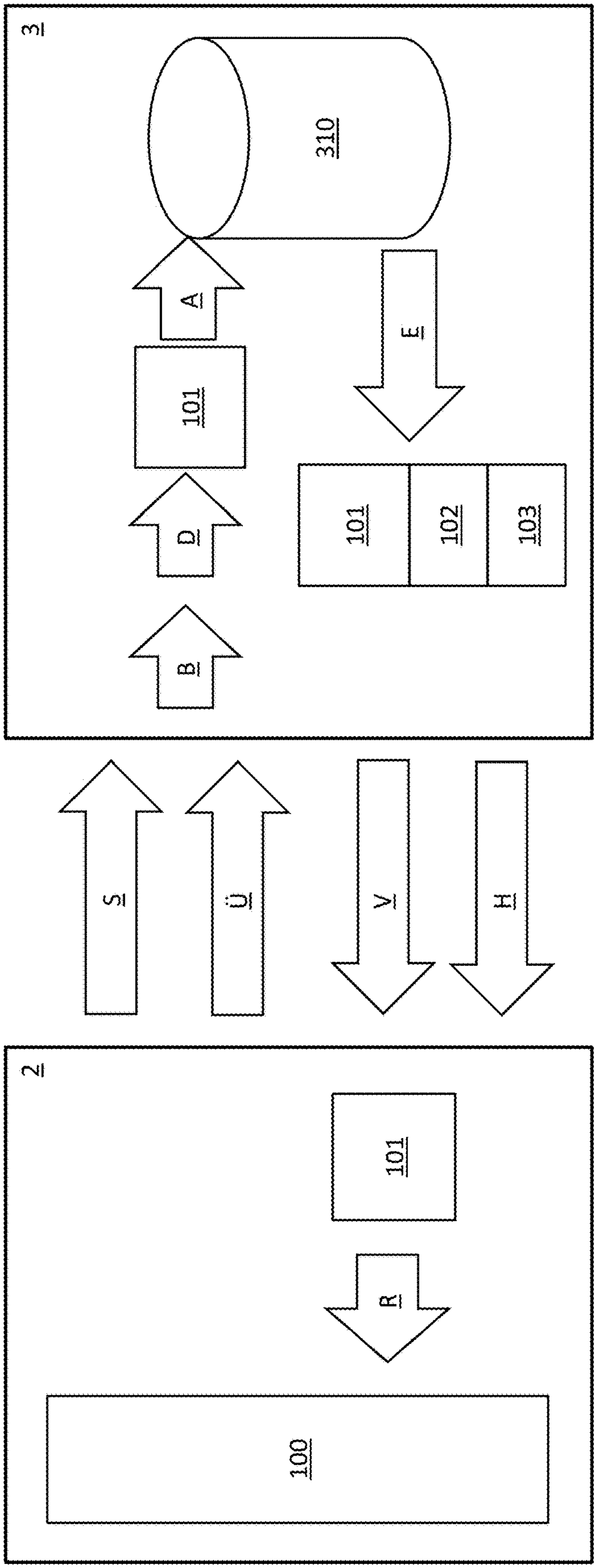
FIG. 4 depicts a flow chart for switching between normal operating mode and failure operating mode in the automation system shown in FIG. 1.

FIG. 4 shows a flow chart for switching between normal operating mode and failure operating mode in the automation system shown in FIG. 1. In the following, it is assumed that the Ethernet protocol is used on the field bus 1, wherein the data exchange with the telegrams in the client units 5 takes place continuously. In principle, however, other field bus concepts may be used for telegram traffic.

In normal operating mode, the main server unit 2 performs cyclical control tasks in order to generate output data for the client units 5 on the basis of input data from the client units 5. At the end of a control process cycle, the main server unit 2 transmits the output data generated on the basis of input data from the client units 5 as normal telegrams on the field bus 1 to the client units 5. The normal telegrams generated by the main server unit 2 each comprise a user data structure 100.

The client units 5 take the output data allocated to the respective client unit 5 from the normal telegrams sent on the field bus 1 by the main server unit 2 in order to carry out a local client unit process with the output data. The data determined in the local client unit process is then entered by the client unit 5 into the normal telegrams circulating on the field bus 1 in the areas provided for this purpose and transmitted back to the main server unit 2. The main server unit 2 then uses the transmitted data as input data for the next control process cycle.

In normal operating mode, a synchronizing step S is also carried out, with the aid of which all normal telegrams of the normal telegram traffic are continuously mirrored to the substitute server unit 3. The substitute server unit 3 receives all normal telegrams exchanged between the main server unit 2 and the client units 5 with the specified user data structure 100.

Furthermore, a monitoring step Ü is continuously carried out in normal operating mode in order to detect a failure of the main server unit 2. The evaluation of whether a failure has occurred is carried out in an evaluating step B by the substitute server unit 3. Processes that are evaluated as a failure of the main server unit 2 in the evaluating step B by the substitute server unit 3 may be external processes and/or internal processes in connection with the main server unit 2.

The external processes for triggering the failure operating mode are determined by the substitute server unit 3 in evaluating step B without the assistance of the main server unit 2. In the case of internal processes for triggering the failure operating mode, the main server unit 2 transmits information that is then used by the substitute server unit 3 in evaluating step B to trigger a failure operating mode of the substitute server unit 3.

With the aid of the main server unit 2, however, not only a failure but also the current status of the control task may be monitored in the monitoring step Ü and then evaluated in the evaluating step B by the substitute server unit 3.

If the failure operating mode is triggered in evaluating step B due to an external or internal process without the control of the telegram traffic by the main server unit 2 being interrupted, the normal operating mode of the main server unit 2 is switched off in order to prevent the main server unit 2 from accessing the field bus 1 in addition to the substitute server unit 3.

If a failure of the main server unit 2 is detected by the substitute server unit 3 in an evaluating step B, a data reduction step D is carried out by the substitute server unit 3. In the data reduction step D, the substitute server unit 3 generates a further user data structure 101 which contains the relevant data elements of the user data structure 100 of the normal telegrams required for a failure operating mode. The other optional data elements of the user data structure 100 of the normal telegrams are discarded.

The data reduction, which determines the relevant data elements of the user data structure 100 of the normal telegrams in the further user data structure 101 is carried out by the substitute server unit 3. In this context, the substitute server unit 3 determines which data elements of the user data structure 100 of the normal telegrams are relevant data elements and which data elements are optional data elements. In an initialization process, the substitute server unit 3 is specified in advance for various states of the control task which data elements in the user data structure 100 of the normal telegrams are relevant data elements and which data elements are optional data elements.

The substitute server unit 3 may determine the status of the control task and thus of the machine on which the control task is being executed as part of data reduction step D on the basis of the data values of the relevant data elements of the currently available normal telegram.

However, it is also possible for the status of the control task to be continuously written into the user data structure 100 of the normal telegrams by the main server unit 2 and transmitted to the substitute server unit 3 with the mirrored normal telegrams of the normal telegram traffic. The status of the control task may be stored as a data element, for example in the form of a numerical value or an enumeration in the user data structure 100 of the normal telegrams. In this case, the substitute server unit 3 may easily determine the status of the control task and thus of the machine on which the control task is being executed.

Furthermore, the status of the control task of substitute server unit 3 may also be determined as part of the data reduction step D on the basis of a combination of an evaluation of the data values of the relevant data elements of the currently available normal telegram and the status information continuously transmitted from the main server unit 2 to the substitute server unit 3.

Based on the state of the control task determined by the substitute server unit 3 in the data reduction step D, a failure operating mode is selected from a repository 310 from a plurality of failure operating modes in a selecting step A.

For the selected failure operating mode, an allocated set of default values is used to replace the optional data elements in the failure telegrams discarded by the substitute server unit 3. In failure operating mode, the substitute server unit 3 generally uses fewer sensors and actuators of the machine, for example to be able to use a smaller server unit and/or a simple or robust control program code. The default values make it possible to integrate sensors or actuators of the machine into the process image in failure operating mode that are not used by the substitute server unit 3. The default telegrams provided by the substitute server unit 3 must also have the same telegram length as the normal telegrams in order to be able to execute the telegram traffic on the field bus 1.

In failure operating mode, control is then taken over by the substitute server unit 3. As part of a substitute control process E, the substitute server unit 3 generates failure telegrams. In the first failure telegram, the data values of the relevant data elements of the currently available normal telegram are used for the relevant data elements and predefined default data values are used for the optional data elements. The failure telegrams thus comprise the further user data structure 101 and a default data structure 102. In addition, a further data structure 103 with data elements for local results of the failure operating mode may also be provided in the failure telegrams.

The client units 5 take the output data allocated to the respective client unit 5 of the further user data structure 101 and, if necessary, the further data structure 103 from the failure telegrams sent on the field bus 1 by the substitute server unit 3 in order to carry out a local client unit process with the output data. The data determined in the local client unit process is then entered by the client units 5 in the failure telegrams circulating on the field bus 1 in areas provided for this purpose and transmitted back to the substitute server unit 3. The substitute server unit 3 then uses the transmitted data as input data for the next failure control process cycle.

In parallel to controlling the machine in failure operating mode, the substitute server unit 3 also monitors in an availability step V whether the main server unit 2 is ready for operation again and also signals that the normal operating mode for the machine may be resumed.

If the substitute server unit 3 detects the operational readiness of the main server unit 2 in the availability step V, the substitute server unit 3 then continuously transmits the relevant data elements of the further user data structure 101 of the failure telegrams to the main server unit 2 in a handover step H, even if the main server unit 2 is not available.

If the main server unit 2 also signals that the normal operating mode for the machine may be resumed, a restart step R is then executed by the main server unit 2. The restart step R may be triggered externally, for example by the operating personnel. Alternatively, the restart step R may be triggered internally, for example by the substitute server unit 3. Normal operating mode is then resumed by the main server unit 2. In the user data structure 100 of the first normal telegram, further default values that are specified for the main server unit 2 and/or the last known data values from the normal operating mode may be used for the optional data elements of the default data structure 102 of the failure telegrams.

As a concrete embodiment example, a 2-axis machine is considered, the first and second axes of which are coupled via software and which would destroy each other mechanically by running into each other if the two axes were not coordinated at all times. In the event of a failure of the main server unit 2, the substitute server unit 3 may then carry out a shutdown of the machine in failure operating mode, for example.

The failure operating mode is selected via a status information "simple status", which is continuously delivered as part of the normal telegrams from the main server unit 2 to the substitute server unit 3 as part of synchronizing step S.

If a failure of the main server unit 2 is detected by the substitute server unit 3 in monitoring step Ü and evaluating step B, the substitute server unit 3 then discards irrelevant values in data reduction step D, such as the temperature values of the machine. The data reduction retains the status information "simple status" and all relevant values about the axes, coupling status, speed and position as a further useful data structure.

In selecting step A, the repository 310 is then scanned for a suitable failure operating mode. The status information "simple status" has the value "production" and the relevant values are "the first and second axes are coupled" and "the first axis has a position between 100-200". From the repository 310, the operating mode "decouple and switch off" is selected as the failure operating mode for the substitute server unit 3.

As temperature measurement values and temperature control values of the cooling elements are no longer relevant in the "decouple and switch off" failure operating mode, default values "0" are used instead in the process images of the failure telegrams, which are stored in repository 310 for the "decouple and switch off" failure operating mode.

If, in selecting step A for determining the suitable failure operating mode, the "simple state" status information has the value "production" and the relevant values are "the first and second axes are not coupled" and "the first axis has a position between 100-200", then the "brake-and-switch-off" operating mode is determined from the repository 310 as the failure operating mode for the substitute server unit 3.

In the "brake and switch off" failure operating mode, the cooling elements in the failure telegrams are set to a predefined temperature having a fixed default value, which is stored in the repository 310 under the "brake and switch off" failure operating mode, but are no longer controlled.

If, however, the status information "simple status" has the value "wait for production" in selecting step A to determine the suitable failure operating mode, then the "simple switch-off" mode is selected from repository 310 as the failure operating mode. The relevant values for the two axes or their positions are not taken into account here. As with the "decouple and switch off" failure operating mode, temperature values are not considered in the "single switch off" failure operating mode, i.e. they are allocated the default value 0.

Many processes must not simply be switched off in the event of a failure of the main server unit 2, but must be brought into a safe operating state that prevents the machine from being destroyed. One example of this is a concrete plant, in which the reactor must be kept in stirring mode in any case, as the reactor would become unusable once the concrete has hardened.

In normal operating mode, the substitute server unit 3 receives all normal telegrams exchanged between the main server unit 2 and the client units 5 in the concrete plant. If a failure of the main server unit 2 is detected by the substitute server unit 3 in monitoring step Ü and evaluating step B, a data reduction step D is carried out by the substitute server unit 3, in which all measured values of the concrete plant are discarded except for the fill level.

Only one failure operating mode "emergency operation" is then provided for the concrete plant. In backup control process E, the substitute server unit 3 controls the agitator to a constant speed when the reactor level is "not empty". Furthermore, all valves are closed and the "manual" operating mode is set. An alarm is also triggered, which indicates the "manual" operating mode.

It is also conceivable that the substitute server unit 3 in failure operating mode allows a machine to continue production in a suboptimal manner, for example with less throughput or with higher rejects, because technologically highly sensitive control algorithms may only be executed on the main server unit 2, possibly also because special hardware is required for this. For example, the main server unit 2 may execute a machine controller based on machine learning. However, machine learning is then dispensed with on the substitute server unit 3 and only classic machine control is carried out.

TABLE 1

| List of reference numerals |
|---|
| 1 Field bus |
| 2 Main server unit |
| 3 Substitute server unit |
| 4 Distributor |
| 5 Client unit (of a machine) |
| 6 Further field bus |
| 7 Main data bus |
| 8 Substitute data bus |
| 5-1 First client unit |
| 5-2 Second client unit |
| 5-X X-th client unit |
| 5-N last client unit |
| 20 Transmitting/receiving device of main server unit |
| 21 Controller of main server unit |
| 22 Data connection of main server unit |
| 30 Transmitting/receiving device of substitute server unit |
| 31 Controller of substitute server unit |
| 32 Data connection of substitute server unit |
| 40 Main server transmitting/receiving device |
| 41 Substitute server transmitting/receiving device unit |
| 42 Client transmitting/receiving device |
| 43 Switching device |
| 44 Data connection of the distributor |
| 50 First transmitting/receiving device |
| 51 Second transmitting/receiving device |
| 52 Processing device |
| 53 Internal data connection of the client unit |
| 61 First communication path |
| 62 Second communication path |
| 71 First unidirectional communication path |
| 72 Second unidirectional communication path |
| 81 Third unidirectional communication path |
| 82 Fourth unidirectional communication path |
| 100 User data structure |
| 101 Further user data structure |
| 102 Default data structure |
| 103 Further data structure |
| 201 First transmitting unit TX |
| 202 First receiving unit RX |
| 301 Second transmitting unit TX |
| 302 Second receiving unit RX |
| 310 Repository |
| 402 Third receiving unit RX |
| 411 Fourth transmitting unit TX |

TABLE 1-continued

| List of reference numerals |
|---|
| 412 Fourth receiving unit RX |
| 421 Fifth transmitting unit TX |
| 422 Fifth receiving unit RX |
| 501 Sixth transmitting unit TX |
| 502 Sixth receiving unit RX |
| 511 Seventh transmitting unit TX |
| 512 Seventh receiving unit RX |

TABLE 2

| List of reference symbols | |
|---|---|
| S Synchronizing step | E Substitute control process |
| Ü Monitoring step | V Availability step |
| A Selecting step | R Restart step |
| B Evaluating step | H Handover step |
| D Data reduction step | |

What is claimed is:

1. An automation system comprising:

a plurality of bus subscribers which are connected to one another via a field bus in order to exchange telegrams having a predetermined data structure between the bus subscribers;

wherein the plurality of bus subscribers comprises a main server unit, a substitute server unit and at least one client unit, wherein in a normal operating mode, the main server unit and the at least one client unit exchange normal telegrams having a predetermined user data structure, wherein the substitute server unit is configured to receive the normal telegrams exchanged between the main server unit and the at least one client unit, and wherein the functionality of the main server unit is continuously monitored and then, if a failure event of the main server unit is detected, the substitute server unit is configured to activate a failure operating mode;

wherein in the failure operating mode, the substitute server unit and the at least one client unit exchange failure telegrams, wherein in the failure telegrams, the predetermined user data structure of the normal telegrams is divided up into relevant data elements and optional data elements, and wherein the substitute server unit is configured to use data values of the relevant data elements of a currently present normal telegram of the normal telegrams for the relevant data elements of a first failure telegram of the failure telegrams, and predetermined default data values for the optional data elements of the first failure telegram.

2. The automation system according to claim 1, wherein the at least one client unit comprises a modified functional scope in the failure operating mode compared to the normal operating mode.

3. The automation system according to claim 2, wherein the modified functional scope of the at least one client unit provides a secured state of the at least one client unit in the failure operating mode.

4. The automation system according to claim 1, wherein a control program code of the substitute server unit differs at least in parts from a control program code of the main server unit.

5. The automation system according to claim 1, wherein;
the substitute server unit comprises a repository having a plurality of failure operating modes,
wherein the substitute server unit is configured to select the failure operating mode from the plurality of failure operating modes based on the data values of the relevant data elements of the currently present normal telegram and/or of a status information continuously transmitted from the main server unit to the substitute server unit upon activation of the failure operating mode.

6. The automation system according to claim 1 wherein, when the substitute server unit detects a restoration of operability of the main server unit after the failure event of the main server unit, the substitute server unit is configured to transmit the relevant data elements of the failure telegrams to the main server unit.

7. The automation system according to claim 6, wherein for reactivating the normal operating mode, the main server unit is configured to use the data values of the relevant data elements of a last failure telegram of the failure telegrams, transmitted by the substitute server unit for a first normal telegram of the normal telegrams.

8. The automation system according to claim 1, wherein the substitute server unit is configured to assume a failure of the main server unit in the event of a predetermined deviation in behavior and/or from the normal operating mode of the main server unit.

* * * * *